United States Patent
Hebert et al.

(10) Patent No.: US 10,625,463 B2
(45) Date of Patent: Apr. 21, 2020

(54) METHOD OF MAKING STRUCTURED HYBRID ADHESIVE ARTICLES INCLUDING LIGHTNING STRIKE PROTECTION SHEETS

(71) Applicant: 3M INNOVATIVE PROPERTIES COMPANY, St. Paul, MN (US)

(72) Inventors: Larry S. Hebert, Hudson, WI (US); Dmitriy Salnikov, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/265,211

(22) Filed: Feb. 1, 2019

(65) Prior Publication Data

US 2019/0160729 A1    May 30, 2019

Related U.S. Application Data

(63) Continuation of application No. 14/408,188, filed as application No. PCT/US2013/045623 on Jun. 13, 2013, now abandoned.

(60) Provisional application No. 61/667,637, filed on Jul. 3, 2012.

(51) Int. Cl.
| | |
|---|---|
| *B29C 59/00* | (2006.01) |
| *C08G 59/56* | (2006.01) |
| *C08G 59/66* | (2006.01) |
| *C09J 163/00* | (2006.01) |
| *C09J 7/20* | (2018.01) |
| *C09D 5/24* | (2006.01) |
| *B29K 63/00* | (2006.01) |
| *B29K 105/00* | (2006.01) |

(52) U.S. Cl.
CPC .......... *B29C 59/005* (2013.01); *C08G 59/56* (2013.01); *C08G 59/66* (2013.01); *C09D 5/24* (2013.01); *C09J 7/20* (2018.01); *C09J 163/00* (2013.01); *B29K 2063/00* (2013.01); *B29K 2105/0097* (2013.01); *B29K 2995/0005* (2013.01); *C09J 2463/00* (2013.01)

(58) Field of Classification Search
None
See application file for complete search history.

(56) References Cited

U.S. PATENT DOCUMENTS

| 5,143,999 A | 9/1992 | Setiabudi |
| 5,360,877 A | 11/1994 | Hwang |
| 5,942,330 A * | 8/1999 | Kelley .................. B32B 27/08 428/343 |
| 6,641,928 B2 | 11/2003 | Takeichi |
| 2003/0214057 A1 | 11/2003 | Huang |
| 2007/0019152 A1 | 1/2007 | Caputo |
| 2010/0227981 A1 | 9/2010 | Chiba |
| 2010/0263898 A1 | 10/2010 | Hebert |
| 2012/0024477 A1 | 2/2012 | Kropp |
| 2014/0186536 A1 * | 7/2014 | Padilla-Acevedo ....... C08J 5/24 427/386 |

FOREIGN PATENT DOCUMENTS

| CA | 2196024 | 8/1997 |
| CN | 101665674 | 3/2010 |
| DE | 4126877 | 11/1992 |
| EP | 0475321 | 3/1992 |
| EP | 1806375 | 7/2007 |
| GB | 1460571 | 1/1977 |
| WO | WO 1999-036484 | 7/1999 |
| WO | WO 2004-007166 | 1/2004 |
| WO | WO 2009-142898 | 11/2009 |
| WO | WO 2010-011705 | 1/2010 |
| WO | WO 2010-091072 | 8/2010 |
| WO | WO 2010-099281 | 9/2010 |
| WO | WO 2010-121044 | 10/2010 |
| WO | WO 2010-121058 | 10/2010 |
| WO | WO 2011-072713 | 6/2011 |
| WO | WO 2012-024354 | 2/2012 |
| WO | WO 2012-092332 | 7/2012 |

OTHER PUBLICATIONS

Kyeong, "Embossing on epoxy thermoset polymer using SiO2 coated nickel template", *Materials Science Forum*, 2007, vol. 539-543, XP002705373, pp. 3580-3585.
International Search report for PCT International Application No. PCT/US2013/045623, dated Aug. 5, 2013, 4 pages.
Hexion Technical Data sheet (2007).

* cited by examiner

*Primary Examiner* — Jose I Hernandez-Kenney
(74) *Attorney, Agent, or Firm* — Philip P. Soo

(57) ABSTRACT

A method is provided for making structured hybrid adhesive articles such as lightning strike protection sheets. In the embodiment for making lightning strike protection sheets, the method comprises the steps of: a) providing an adhesive article comprising: i) a base resin comprising an epoxy resin, ii) a first epoxy curative, and iii) a second epoxy curative; b) reacting the base resin with the first epoxy curative such that the first epoxy curative is substantially reacted with epoxy resin in the article and the second epoxy curative is substantially unreacted in the article; c) embossing the adhesive article with a relief pattern; d) depositing an electrically-conductive layer onto at least a portion of the embossed surface; and e) curing the adhesive article such that the second epoxy curative is substantially reacted with epoxy in the article. In some embodiments, the method additionally comprises a step of embedding a scrim in the adhesive.

20 Claims, 1 Drawing Sheet

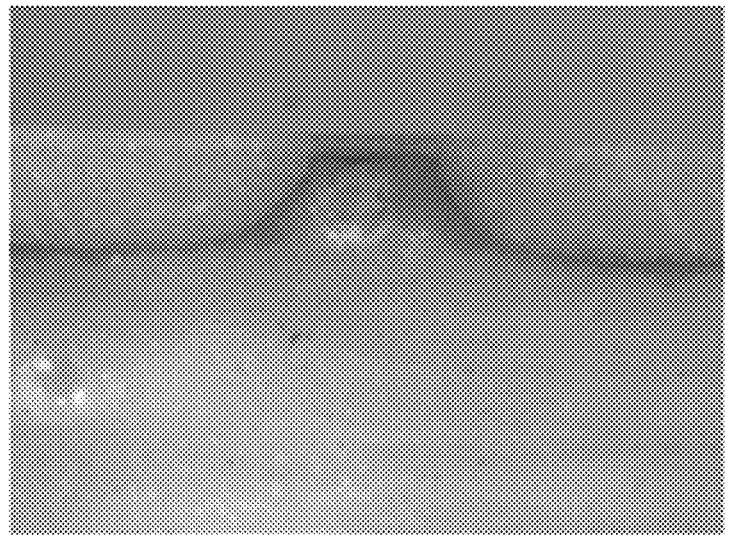

METHOD OF MAKING STRUCTURED HYBRID ADHESIVE ARTICLES INCLUDING LIGHTNING STRIKE PROTECTION SHEETS

FIELD OF THE DISCLOSURE

This disclosure relates to structured articles comprising adhesives and methods of their manufacture, including in some embodiments structured articles comprising curable epoxy adhesives.

SUMMARY OF THE DISCLOSURE

Briefly, the present disclosure provides a method of making structured hybrid adhesive articles comprising the steps of: a) providing an adhesive article comprising: i) a base resin comprising an epoxy resin, ii) a first epoxy curative, and iii) a second epoxy curative, by reacting the base resin with the first epoxy curative such that the first epoxy curative is substantially reacted with epoxy resin in the article and the second epoxy curative is substantially unreacted in the article; b) embossing the adhesive article with a relief pattern; and c) curing the adhesive article such that the second epoxy curative is substantially reacted with epoxy in the article. In some embodiments step a) is carried out prior to step b). In some embodiments step a) is carried out simultaneously with step b).

In some embodiments, the first and second epoxy curatives may be chosen such that the second epoxy curative may remain substantially unreacted in the composition under conditions of temperature and duration that render the first epoxy curative substantially reacted with epoxy resin in the composition. In some embodiments, the first and second epoxy curatives may be chosen such that the second epoxy curative remains substantially unreacted in the composition after 24 hours at 72° F. and the first epoxy curative becomes substantially reacted with epoxy resin in the composition after 24 hours at 72° F. In some embodiments, the first epoxy curative is a polymercaptan. In some embodiments, the second epoxy curative is a polyamine. In some embodiments, the base resin includes no acrylic resin.

In some embodiments, the method additionally comprises the step of d) embedding a scrim in the adhesive article prior to or concurrent with step b).

In some embodiments, the method additionally comprises the step of e) depositing an electrically conductive layer such as a layer of metal onto the surface of the adhesive article embossed with a relief pattern prior to step c).

BRIEF DESCRIPTION OF THE DRAWING

FIG. 1 is a photomicrograph of a cross section of a cured composite panel prepared from a curable embossed film as described below for Example 9.

DETAILED DESCRIPTION

The present disclosure provides structured articles comprising a high strength structural hybrid adhesive material. In the structural hybrid, two polymer networks are formed sequentially. The first network provides structural integrity to the curable structural adhesive article. The second network, typically a thermosetting resin, can be cured after the adhesive article is formed into a structured article by embossing or any other type of patterning. The resulting cured material can be an interpenetrating polymeric network or a single-phase polymeric network.

The present disclosure utilizes a high strength structural hybrid adhesive material and methods such as disclosed in PCT Patent App. US2011/067513 filed Dec. 28, 2011, claiming priority to U.S. Provisional Pat. App. 61/428,037, filed Dec. 29, 2010, the contents of which are incorporated herein by reference.

The adhesive used herein includes is a two step reactive system that includes a base resin component that reacts rapidly with a sufficient amount of a first component to provide an adhesive article which will retain an embossed relief pattern. The invention includes a latent catalyst or curative for the remaining base resin that can be activated to provide a structural adhesive. The first component reaction and chemistry are chosen to maintain the latency of the uncured resulting article. The forming step can occur either on a web or on the substrate to be bonded. In some embodiments, the structural hybrid adhesive contains only one type of base resin, e.g., an epoxy resin. In some embodiments, the structural hybrid adhesive contains only epoxy resin as a base resin. In some embodiments, the structural hybrid adhesive contains only one resin as a base resin. In some embodiments, the structural hybrid adhesive contains only one epoxy resin as a base resin. In some embodiments, the base resin includes no acrylic resin.

This method allows for the use of the epoxy resin in the forming and embossing steps as well as in thermosetting steps so strength is not compromised. Because of the low temperature processing, a variety of latent curative or catalysts become available for the second thermosetting step. Furthermore, thick, opaque and pigmented articles are possible to process.

In some embodiments, the present disclosure makes use of a mixed curative that includes at least one rapid-reacting curative and at least one latent curative.

Any suitable epoxy resin may be used in the practice of the present disclosure.

Any suitable rapid-reacting curative may be used in the practice of the present disclosure. Any suitable latent curative may be used in the practice of the present disclosure. In some embodiments, the latent curative remains substantially unreacted with an epoxy resin under conditions of time and temperature sufficient to substantially react the rapid-reacting curative with the epoxy resin, and the latent curative will substantially react with the epoxy resin under more extensive conditions of time and temperature.

In one embodiment, the present disclosure provides a method of blending an uncured epoxy resin with the mixed curative according to the present disclosure and substantially reacting (curing) the epoxy resin with the rapid-reacting curative while leaving the latent curative substantially unreacted (uncured) to form a structural hybrid adhesive material to form an article, which is thereafter embossed with a relief pattern to create an embossed adhesive article. In another embodiment, the present disclosure provides a method of blending an uncured epoxy resin with the mixed curative according to the present disclosure and substantially reacting (curing) the epoxy resin with the rapid-reacting curative while leaving the latent curative substantially unreacted (uncured) to form a structural hybrid adhesive material, while simultaneously embossing said material with a relief pattern to create an embossed adhesive article.

In some embodiments, additional layers may be added to the embossed surface of the adhesive article. In some embodiments, an electrically conductive layer such as a metal layer may be applied to the embossed surface of the article. The conductive layer may be added by any suitable method, including deposition methods such as chemical deposition, electrodeposition or vapor deposition. The resulting article includes a patterned conductive layer. This method may be used to create lightning strike protection sheets described in PCT Patent App. US2010/031263, published Oct. 21, 2010, or PCT Patent App. US2010/031280, published Oct. 21, 2010, the disclosures of which are incorporated herein by reference.

Typically, the lightning protection sheet of the present disclosure is lightweight. In some embodiments, the lightning protection sheet weighs less than 100 g/m², in some embodiments less than 50 g/m², in some embodiments less than 25 g/m², in some embodiments less than 15 g/m², and in some embodiments less than 10 g/m². The lightning protection sheet typically weighs at least 1 g/m². In some embodiments, the lightning protection sheet contains an amount of electrically conductive material weighing less than 50 g/m², in some embodiments less than 35 g/m², in some embodiments less than 20 g/m², in some embodiments less than 10 g/m², in some embodiments less than 4 g/m². The lightning protection sheet typically contains at least 0.5 g/m² of electrically conductive material. In some embodiments, the electrically conductive film patterned into a plurality of hill features which forms a component of the lightning protection sheet weighs less than 50 g/m², in some embodiments less than 35 g/m², in some embodiments less than 20 g/m², in some embodiments less than 10 g/m², in some embodiments less than 4 g/m₂. The electrically conductive film patterned into a plurality of hill features which forms a component of the lightning protection sheet typically weighs at least 0.5 g/m².

The height h of the hill features may be any suitable height. The height h of hill features is typically between 0.1 microns and 10 mm, more typically between 1 micron and 2 mm, and more typically between 6 microns and 1 mm. The width w of hill features 40 may be any suitable width. The width w of hill features 40 is typically between 1 micron and 50 mm, more typically between 10 microns and 10 mm, and more typically between 20 microns and 1 mm. The pitch p of the hill features is equal to width w plus distance d between hill features. The pitch p of the hill features 40 may be any suitable pitch. The pitch p of hill features 40 is typically between 10 microns and 50 mm, more typically between 50 microns and 10 mm, and more typically between 200 microns and 1 mm.

In some embodiments, the electrically-conductive layer is patterned with a plurality of valley features having a depth d between 6 microns and 1 mm.

As used herein, a "hill feature" in a film or layer means a local maximum in height surrounded by areas of lower height, height being measured orthogonal to the general plane of the sheet (i.e., regardless of bends or curves that follow bends or curves in the underlying surface), with positive height being in the direction away from the structure side of the sheet. Hill features may include, without limitation, cones, hemispheres, humps, pyramids of 3, 4 or more sides, or hard- or soft-edged frusta of any of the forgoing. As used herein, the height h of a hill feature means the difference in height between the local maximum and the adjacent local minima of height, averaged over 360 degrees. In some embodiments, hill features may also include, without limitation, dimpled frusta, e.g., "volcano" or bisected torus shapes, in which case the height h of the hill feature is measured at the rim of the hill feature.

As used herein, a "valley feature" in a film or layer means a local minimum in height surrounded by areas of greater height. Valley features may include, without limitation, inverted cones, inverted hemispheres, inverted humps, inverted pyramids of 3, 4 or more sides, or inverted hard- or soft-edged frusta of any of the forgoing. As used herein, the depth d of a valley feature means the difference in height between the local minimum and the adjacent local maxima of height, averaged over 360 degrees. In some embodiments, valley features may also include, without limitation, inverted dimpled frusta, in which case the depth d of the valley feature is measured at the deepest point(s) of the valley feature. In some embodiments, a valley feature may penetrate entirely through a film or layer.

In some embodiments, the base resin is reacted with the first epoxy curative while in contact with an electrically conductive layer such as a metal layer, to form an article with attached conductive layer. The article with attached conductive layer may be thereafter embossed to create an article which includes a patterned conductive layer. This method may be used to create articles described in PCT Patent App. US2010/031263, published Oct. 21, 2010, or PCT Patent App. US2010/031280, published Oct. 21, 2010, the disclosures of which are incorporated herein by reference.

In some embodiments, the embossed surfaces of two layers of the embossed curable article may be brought together to create a bilayer with interstitial gaps. In one such embodiment, the patterns of the embossed surfaces are brought together in registration, with gaps in one surface meeting gaps in the opposing surface. In another such embodiment, the patterns of the embossed surfaces are brought together out of registration.

In another embodiment, the pattern of an embossed surfaces is brought together with an unpatterned surface to create a bilayer with interstitial gaps.

In some embodiments, the embossed adhesive article of the present disclosure is supplied on a liner. In some embodiments, the embossed adhesive article is supplied as a free-standing film without a liner. In some embodiments, the embossed adhesive article includes a barrier layer, such as a layer of fluoropolymer. In some embodiments, the embossed adhesive article includes a scrim. In some embodiments, the embossed adhesive article includes a non-woven scrim. In some embodiments, the embossed adhesive article includes a woven scrim.

As used herein, the terms "substantially unreacted" or "substantially uncured" typically means at least 70% unreacted or uncured, but more typically means at least 80% unreacted or uncured and more typically means at least 90% unreacted or uncured. As used herein, the terms "substantially reacted" or "substantially cured" typically means at least 70% reacted or cured, but more typically means at least 80% reacted or cured and more typically means at least 90% reacted or cured.

As used herein, the terms "to emboss," "embossing" or "embossed" refer to a process of producing a relief pattern on the surface of a material; typically accomplished by applying a tool or mold to the material with sufficient pressure to leave a durable impression after removal of the tool or mold.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

The following abbreviations are used to describe the examples:
° C.: degrees Centigrade
° F.: degrees Fahrenheit
cm: centimeters
$g/m^2$: grams per square meter
kgcw: kilograms per centimeter width
kPa: kilopascals
MPa: Megapascals
mg: milligrams
mil: $10^{-3}$ inches
mm: millimeters
mm/min: millimeters per minute
piw: pounds per inch width
winch: $10^{-6}$ inches
μm: micrometers
$oz/yd^2$: ounces per square yard
psi: pounds per square inch
rpm: revolutions per minute Materials Used:

CC3-800: A mercaptan-terminated liquid epoxy curing agent, available under the trade designation "CAPCURE 3-800" from BASF Corporation, Florham Park, N.J.

CC-40: A pre-catalyzed mercaptan based epoxy hardener, available under the trade designation "CAPCURE 40 SEC HV" from BASF Corporation.

CG-1400: A micronized dicyandiamide, having an approximate amine equivalent weight of 21 grams/equivalent, available under the trade designation "AMICURE CG-1400", from Air Products and Chemicals, Inc.

DEH-85: An unmodified bis-phenol-A hardener having an active hydrogen equivalent weight of approximately 265 grams/equivalent, available under the trade designation "DEH-85", from Dow Chemical Company, Midland, Mich.

DER-6508: An isocyanate-modified 2-functional epoxy resin, obtained under the trade designation "DER-6508" from Dow Chemical, Midland, Mich.

DF-1: A polymeric, non-silicone, flow additive, available under the trade designation "DYNOADD F-1" from Dynea Oy, Helsinki, Finland.

EPON 826: A medium molecular weight diglycidyl ether of bisphenol A resin having an epoxide equivalent weight of from 178 to 186 grams/equivalent, available under the trade designation "EPON 826" from Momentive Performance Materials, Houston, Tex.

EPON 828: A bisphenol-A polyepoxide resin having an approximate epoxy equivalent weight of 188 grams/equivalent, available under the trade designation "EPON 828", from Momentive Specialty Chemicals.

EPON SU-8: An epoxy novolac resin having an average epoxide group functionality of approximately eight, available under the trade designation "EPON SU-8" from Momentive Specialty Chemicals.

MX-120: A diglycidyl ether of bisphenol-A epoxy resin containing 25 weight percent butadiene-acrylic co-polymer core shell rubber having an approximate epoxy equivalent weight of 243 grams/equivalent, available under the trade designation "KANE ACE MX-120", from Kaneka Texas Corporation, Pasadena, Tex.

MX-257: A diglycidyl ether of bisphenol-A epoxy resin containing 37.5 weight percent butadiene-acrylic co-polymer core shell rubber having an approximate epoxy equivalent weight of 294 grams/equivalent, available under the trade designation "KANE ACE MX-257", from Kaneka Texas Corporation.

MY-720: A multifunctional epoxy resin, available under the trade designation "ARALDITE MY-720" from Huntsman Corporation, Woodlands, Tex.

PG-7: A copper-phthaocyanine pigment, available under the trade designation "VYNAMON GREEN 600734" from Heucotech Ltd., Fairless Hills, Pa.

QX-11: A mercaptan curing agent, available under the trade designation "EPOMATE QX-11", from Japan Epoxy Resins, Inc., Tokyo, Japan.

R-960: A rutile titanium dioxide pigment, available under the trade designation "TI-PURE R-960" from E.I. du Dupont de Nemours and Company, Wilmington, Del.

RA-95: A bisphenol-A epoxy resin modified carboxyl terminated butadiene acrylonitrile elastomer, available under the trade designation "HYPDX RA-95" from CVC Specialty Chemicals Inc., Moorestown, N.J.

SD-3: A modified hectorite clay, available under the trade designation "BENTONE SD-3" from Elementis Specialities, Hightown, N.J.

TDI-CDI: A 40% by weight solution in toluene of a phenyl isocyanate capped toluene diisocyanate polycarbodiimide, having a 2:1 by weight ratio of toluene diisocyanate:phenyl isocyanate.

TMMP: Trimethylolpropane tris(3-mercaptoproprionate), available from Wako Chemical USA, Inc., Richmond, Va.

U-52: An aromatic substituted urea (4,4'-methylene bis (phenyl dimethyl urea), having an approximate amine equivalent weight of 170 grams/equivalent, available under the trade designation "OMICURE U-52", from CVC Specialty Chemicals Inc., Moorestown, N.J.

UR2T: An epoxy resin hardener, available under the trade designation "AMICURE UR2T" from Air Products and Chemicals Inc.

Preparation of Reactive Epoxy Compositions (REC)

One-Part Epoxy Reactive Composition

A millbase was prepared as follows. At a temperature of 70° F. (21.1° C.), 66.66 grams EPON 826, 168.36 grams MX-120, 3.7 grams PG-7, 18.44 grams R-960, 6.18 grams SD-3, 34.83 grams CG-1400 and 1.83 grams U-52 were charged into plastic cup designed for use in a planetary mill, model "SPEED MIXER DA 400 FV", available from Synergy Devices Limited, Buckinghamshire, United Kingdom. The cup was placed into a planetary mixer and mixed at 2200 rpm for 2 minutes. The mixture was milled in a three-roll mill for three passes and then set aside.

At a temperature of 70° F. (21.1° C.), 19.26 grams DER-6508 and 7.57 grams EPON SU-8 were manually crushed with a pestle and mortar and charged into another plastic cup designed for use in the planetary mill. 16.33 grams MEK was added to the cup, which was then secured to the mill and rotated at 2,200 rpm until the mixture was dissolved approximately 15 minutes. 3.34 grams MY-720, 0.74 grams DF-1, 9.48 grams RA-95, 37.57 grams of the millbase and 5.47 grams TDI-CDI were added to the cup, plus sufficient toluene was to make the total composition 100 parts by weight. The mixture was returned to the planetary mixer, and the mixing was continues for another 2 minutes at 2,000 rpm. The mixture was manually scraped and returned to the planetary mill until all components were homogeneously dispersed, approximately 4 minutes.

Two-Part Epoxy Reactive Compositions

Part-A:

A-1

43.2, 2.4, 4.4, 41.6 and 8.4 parts by weight, respectively, of QX-11, TMMP, DEH-85, CC3-800 and CC-40 were added to a 100 gram capacity plastic planetary mill cup. The cup was then secured into the planetary type mill and the components mixed at 2,750 rpm and 72° F. (22.2° C.) until dissolved, approximately five minutes.

Reactive Compositions A-2 Through A-5:

Reactive compositions as listed in Table 1 were prepared according to the procedure generally described in A-1.

TABLE 1

| | Reactive Composition (Parts by Weight) | | | | |
|---|---|---|---|---|---|
| Component | A-1 | A-2 | A-3 | A-4 | A-5 |
| QX-11 | 43.2 | 34.5 | 34.6 | 0 | 0 |
| TMMP | 2.4 | 1.9 | 1.7 | 4.4 | 4.2 |
| DEH-85 | 4.4 | 3.5 | 3.8 | 9.2 | 9.1 |
| CC3-800 | 41.6 | 49.9 | 49.7 | 71.8 | 72.0 |
| CC-40 | 8.4 | 10.2 | 10.2 | 14.6 | 14.7 |

Part-B:

66.4 parts MX-257, 27.4 parts Epon-828, 4.1 parts CG-1400 and 2.1 parts UR2T were added to a 100 gram capacity plastic planetary mill cup. The cup was then secured into the planetary type mill and the components mixed at 2,750 rpm and 72° F. (22.2° C.) for two minutes. The cup was removed from the mill, the mixture scrapped from the wall of the cup, and then returned to the planetary mill and mixed for an additional two minutes.

Part-A and Part-B compositions were added, according to the parts by weight ratios listed in Table 2, to a 20 gram capacity planetary mill type cup and mixed at 2,750 rpm and 72° F. (22.2° C.) on the planetary mill for 20 seconds.

TABLE 2

| | | Two-Part | | |
|---|---|---|---|---|
| Reactive Epoxy Composition | One-Part | Part A | Ratio by Weight Part B | Ration by Weight |
| REC-1 | Yes | No | No No | No |
| REC-2 | No | A-1 | 1 Yes | 3 |
| REC-3 | No | A-2 | 1 Yes | 2.2 |
| REC-4 | No | A-3 | 1 Yes | 2.4 |
| REC-5 | No | A-4 | 1 Yes | 2.4 |
| REC-6 | No | A-5 | 1 Yes | 6 |

Preparation of Curable Liner-Supported Films

Method A:

The one-part epoxy reactive mixture was applied on the silicone coated side of a 5 mil (127 μm) bleached paper liner having an opposing polyethylene coating, product number "23210 76# BL KFT H/HP 4D/6MH" Loparex, Inc., Iowa City, Iowa, by means of a knife-over-bed coating station at 72° F. (22° C.) and a bar gap of 8 mils (203.2 μm). Each liner-film construction, measuring approximately 11.5 by 6 inches (29.2 by 15.2 cm), was dried at 135° F. (57.2° C.), cooled and held for 24 hours at 72° F. (22.2° C.), then stored at −20° F. (−28.9° C.) until used for subsequent processing.

Method B:

The blended two-part epoxy reactive mixture was applied between the silicone coated sides of two 5 mil (127 μm) bleached paper liners having an opposing polyethylene coating, product number "23210 76# BL KFT H/HP 4D/6MH" Loparex, Inc., Iowa City, Iowa. The liner/curable epoxy film/liner sandwich was made by means of a knife-over-bed coating station at 72° F. (22° C.) and a bar gap of 13 mils (203.2 μm). Each liner/film/liner sandwich, measuring approximately 11.5 by 6 inches (29.2 by 15.2 cm), was held for 24 hours at 72° F. (22.2° C.), then stored at −20° F. (−28.9° C.) until used for subsequent processing.

Method C:

A liner/curable epoxy film construction was made according to the method generally described in Method A, wherein the one-part epoxy reactive mixture was substituted with a two-part epoxy reactive mixture, after which it was stored at approximately 72° F. (22° C.) for 24 hours.

Preparation of Curable, Scrim Embedded, Liner Supported Films

One liner of a liner-curable film-liner sandwich was removed and replaced with a similar size section of 0.125 oz/yd² (4 g/m²) nonwoven polyester fabric, obtained from Technical Fiber Products, Inc., New York. A polypropylene liner was placed over the nonwoven polyester fabric and the lay-up passed between two rubber-coated nip rollers at approximately 72° F. (22° C.) and 80 psi (551.6 kPa) in order to embed the polyester fabric.

Preparation of Curable Embossed Films

The curable embossed film was subjected to a partial cure cycle, as listed in Table 3 then allowed to cool to 72° F. (22.2° C.). A 0.5 inch (12.7 millimeters) thick aluminum tool having an approximately 40 mil (1 mm) high truncated pyramidal (frustum) pattern at densities between 50 and 150 pyramids/sq. inch was fabricated. One face of the curable film was exposed and laid on the aluminum tool. The film was covered by a sheet of 0.005 inch (0.13 millimeters) thick paper liner having a silicone coating on one side and a polyethylene coating on the opposite side, such that the curable epoxy contacted the silicone-coated side of the liner. A 0.5 inch (12.7 millimeters) thick aluminum plate was laid over the release liner and the assembly placed in a hydraulic press operating at about 100 psi (689 kPa). The assembly was preheated according to the time and temperature listed in Table 2, after which the film was removed from the sandwich and allowed to cool to 72° F. (22.2° C.).

Curable Composite Panel Preparation

The one-part reactive composition was applied to the embossed surface of the embossed curable film and manually wetted out and filled into each depression in the surface using a spreader. The film was then oven dried for 20 minutes at 135° F. (57.2° C.) and allowed to cool back to 72° F. (22.2° C.). Twelve plies of an epoxy impregnated unidirectional graphite fiber, obtained under the trade designation "P2353U 19 152" from Toray Composites (America), Inc., Tacoma, Wash., was applied over the cured epoxy coating, after which the liner was removed from the planar surface of the embossed curable film and the composite was cured according to one of the following cycles.

Cure Cycles.

Cycle A

The curable embossed film composite was then vacuum bagged with a vacuum of approximately 28 inches mercury (94.8 kPa) in an autoclave, model number "ECONOCLAVE 3×5", from ASC Process Systems, Sylmar, Calif. Autoclave pressure was increased to 60 psi (413.7 kPa) and the temperature was increased at a rate of 4.5° F. (2.5° C.) per minute to 350° F. (176.7° C.), held for 90 minutes at this temperature, then cooled at a rate of 5° F. (2.8° C.) per minute to 72° F. (22.2° C.) before releasing the pressure and vacuum.

Cycle B

The curable embossed film composite was then vacuum bagged with a vacuum of approximately 28 inches mercury (94.8 kPa) in an autoclave, model number "ECONOCLAVE 3×5", from ASC Process Systems, Sylmar, Calif. Autoclave pressure was increased to 45 psi (310.3 kPa), during which the vacuum bag was vented to the atmosphere once the autoclave pressure surpassed 15 psi (103.4 kPa). Autoclave temperature was then increased at a rate of 4.5° F. (2.5° C.) per minute to 250° F. (121.1° C.), held for 90 minutes at this temperature, then cooled at a rate of 5° F. (2.8° C.) per minute to 72° F. (22.2° C.) before releasing the pressure and vacuum.

Cycle C

The curable embossed film was cured, open faced, in an oven at 270° F. (132.2° C.) for the duration in Table 3. After curing, the film was removed from the oven and allowed to cool to 72° F. (22.2° C.).

The various epoxy compositions, embossed film conditions and curing cycles are listed in Table 3. The fidelity of the embossed pattern of the curable film composition, and the ability to retain the pattern through the curing cycle, is reported in Table 4.

TABLE 3

| Sample | Reactive Epoxy Composition | Film Preparation Method | Scrim | Partial Cure Conditions Temp. (° C.) | Partial Cure Conditions Time (Min.) | Embossing Conditions Temp. (° C.) | Embossing Conditions Time (Min.) | Cycle Cure Conditions Cycle No. | Cycle Cure Conditions Time (Min.) |
|---|---|---|---|---|---|---|---|---|---|
| Comparative A | REC-1 | A | No | RT | 1440 | RT | 2 | C | 15 |
| Comparative B | REC-1 | A | No | 132.2 | 25 | RT | 2 | C | 20 |
| Comparative C | REC-1 | A | Yes | 132.2 | 25 | RT | 2 | C | 20 |
| Comparative D | REC-1 | A | No | 132.2 | 25 | 132.2 | 15 | <1> | <1> |
| Comparative E | REC-1 | A | Yes | 132.2 | 25 | 132.2 | 7 | <1> | <1> |
| Comparative F | REC-1 | A | Yes | 132.2 | 30 | 48.9 | 1.5 | A | 90 |
| Comparative G | REC-1 | A | No | 148.9 | 15 | 54.4 | 1.5 | A | 90 |
| Comparative H | REC-1 | A | No | 148.9 | 30 | 60.0 | 2 | A | 90 |
| Comparative I | REC-1 | A | No | 148.9 | 30 | 65.6 | 2 | A | 90 |
| Example 1 | REC-2 | B | No | 22.0 | 17000 | 135.0 | 6 | A | 90 |
| Example 2 | REC-3 | B | No | 22.0 | 2880 | 104.4 | 1.5 | B | 90 |
| Example 3 | REC-3 | B | No | 22.0 | 2880 | 104.4 | 1.5 | B | 90 |
| Example 4 | REC-3 | B | No | 22.0 | 2880 | 104.4 | 1.5 | B | 90 |
| Example 5 | REC-3 | B | No | 22.0 | 2880 | 104.4 | 1.5 | B | 90 |
| Example 6 | REC-3 | B | No | 22.0 | 2880 | 104.4 | 1.5 | B | 90 |
| Example 7 | REC-3 | B | No | 22.0 | 2880 | 104.4 | 1.5 | B | 90 |
| Example 8 | REC-3 | B | No | 22.0 | 2880 | 104.4 | 1.5 | B | 90 |
| Example 9 | REC-3 | B | No | 22.0 | 2880 | 104.4 | 1.5 | B | 90 |
| Example 10 | REC-4 | B | No | 22.0 | 4320 | 88.9 | 1.5 | <3> | <3> |
| Example 11 | REC-4 | B | No | 22.0 | 4320 | 100.0 | 1.5 | <3> | <3> |
| Example 12 | REC-6 | C | No | 22.0 | 10080 | 98.9 | 1.5 | <2> | <2> |
| Example 13 | REC-5 | C | No | 22.0 | 10080 | 98.9 | 1.5 | <4> | <4> |
| Example 14 | REC-5 | C | No | 57.2 | 20 | 98.9 | 1.5 | A | 90 |
| Example 15 | REC-5 | C | Yes | 57.2 | 20 | 98.9 | 1.5 | A | 90 |

<1> Film brittle. No cure cycle accomplished.
<2> Embossing replication poor. No cure cycle accomplished.
<3> Embossing results similar to Examples 2-9. No cure cycle accomplished.
<4> Embossing results similar to Example 14. No cure cycle accomplished.

TABLE 4

| Sample | Embossed Pattern Fidelity | Cured Pattern Retention |
|---|---|---|
| Comparative A | Poor | No Pattern |
| Comparative B | Poor | No Pattern |
| Comparative C | Poor | No Pattern |
| Comparative D | Good (Brittle) | Not suitable for cure |
| Comparative E | Good (Picking) | Not suitable for cure |
| Comparative F | Fair | Fair |
| Comparative G | Fair | Poor |
| Comparative H | Fair | No Pattern |
| Comparative I | Fair | No Pattern |
| Example 1 | Excellent | Excellent |
| Example 2 | Fair | Excellent |
| Example 3 | Fair | Excellent |
| Example 4 | Fair | Excellent |
| Example 5 | Fair | Excellent |
| Example 6 | Fair | Excellent |
| Example 7 | Fair | Excellent |
| Example 8 | Fair | Excellent |
| Example 9 | Fair | Excellent |
| Example 10 | Fair | Not cured |
| Example 11 | Fair | Not cured |
| Example 12 | Poor | Not suitable for cure |
| Example 13 | Excellent | Not cured |
| Example 14 | Excellent | Excellent |
| Example 15 | Excellent | Excellent |

Conductive Interlayer

In an additional prophetic example step, a conductive interlayer is applied to the embossed surface of the embossed curable film prior to application of the one-part reactive composition described above in "Curable Composite Panel Preparation." The conductive layer is added by a deposition method, such as chemical deposition, electrodeposition or vapor deposition. The resulting panel contains a patterned interior conductive interlayer. This method may be used to create articles described in PCT Patent App. US2010/031263, published Oct. 21, 2010, or PCT Patent App. US2010/031280, published Oct. 21, 2010, the disclosures of which are incorporated herein by reference.

Bilayer with Interstitial Gaps

In another prophetic example step, the embossed surfaces of two layers of the embossed curable film are brought together prior to final cure to create a bilayer with interstitial gaps. In one variation of such a step, the patterns of the embossed surfaces are brought together in registration, with gaps in one surface meeting gaps in the opposing surface. In another variation of such a step, the patterns of the embossed surfaces are brought together out of registration. In another variation of such a step, the embossed surface of one layer of the embossed curable film is brought together with an unembossed second layer prior to final cure to create a bilayer with interstitial gaps.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A method of making a lightning strike protection sheet, the method comprising the steps of:
   a) providing an adhesive article comprising:
      i) a base resin comprising an epoxy resin;
      ii) a first epoxy curative; and
      iii) a second epoxy curative;
   b) reacting the base resin with the first epoxy curative to form a first polymer network such that the first epoxy curative is substantially reacted with epoxy resin in the adhesive article and the second epoxy curative is substantially unreacted in the adhesive article;
   c) embossing the adhesive article with a relief pattern;
   d) depositing an electrically-conductive layer onto at least a portion of the surface of the adhesive article embossed with a relief pattern, such that the electrically-conductive layer is patterned with a plurality of hill features and/or valley features; and
   e) after step d), curing the adhesive article to form a second polymer network such that the second epoxy curative is substantially reacted with epoxy in the article.

2. The method according to claim 1 wherein the first and second epoxy curatives are chosen such that the second epoxy curative may remain substantially unreacted in the composition under conditions of temperature and duration that render the first epoxy curative substantially reacted with epoxy resin in the composition.

3. The method according to claim 1, wherein the first and second epoxy curatives are chosen such that the second epoxy curative remains substantially unreacted in the composition after 24 hours at 72° F. and the first epoxy curative becomes substantially reacted with epoxy resin in the composition after 24 hours at 72° F.

4. The method according to claim 1, wherein the first epoxy curative is a polymercaptan.

5. The method according to claim 1, wherein the second epoxy curative is a polyamine.

6. The method according to claim 1, wherein the base resin includes no acrylic resin.

7. The method according to claim 1 additionally comprising the step of f) embedding a scrim in the adhesive layer; prior to step c).

8. The method according to claim 1 additionally comprising the step of f) embedding a scrim in the adhesive layer; concurrent with step c).

9. The method according to claim 1 wherein step b) is carried out prior to step c).

10. The method according to claim 1 wherein step b) is carried out simultaneously with step c).

11. The method of claim 1, wherein the electrically-conductive layer weighs at least 0.5 $g/m^2$ and less than 50 $g/m^2$.

12. The method of claim 11, wherein the electrically-conductive layer weighs at least 0.5 $g/m^2$ and less than 20 $g/m^2$.

13. The method of claim 12, wherein the electrically-conductive layer weighs at least 0.5 $g/m^2$ and less than 4 $g/m^2$.

14. The method of claim 1, wherein the electrically-conductive layer is patterned with a plurality of hill features having a height h between 0.1 microns and 10 mm.

15. The method of claim 14, wherein the plurality of hill features have a height h between 1 micron and 2 mm.

16. The method of claim 15, wherein the plurality of hill features have a height h between 6 microns and 1 mm.

17. The method of claim 1, wherein the electrically-conductive layer is patterned with a plurality of hill features having a pitch of between 10 microns and 50 mm.

18. The method of claim 17, wherein the plurality of hill features have a pitch of between 50 microns and 10 mm.

19. The method of claim 18, wherein the plurality of hill features have a pitch of between 200 microns and 1 mm.

20. The method of claim 1, wherein the electrically-conductive layer is patterned with a plurality of valley features having a depth d between 6 microns and 1 mm.

* * * * *